(12) United States Patent  
Lennox

(10) Patent No.: US 6,580,191 B2
(45) Date of Patent: Jun. 17, 2003

(54) FUEL CELL POWERED MAGNETICALLY DRIVEN SHAFT ASSEMBLY

(75) Inventor: John A. Lennox, Abbotsford (CA)

(73) Assignee: Gimbie Enterprises Ltd., Abbotsford (CA)

( * ) Notice: Subject to any disclaimer, the term of this patent is extended or adjusted under 35 U.S.C. 154(b) by 0 days.

(21) Appl. No.: 09/865,682

(22) Filed: May 29, 2001

(65) Prior Publication Data

US 2002/0180298 A1 Dec. 5, 2002

(51) Int. Cl.[7] .......................... H02K 31/00; H01M 8/00
(52) U.S. Cl. ............................................ 310/178; 429/12
(58) Field of Search ........................ 310/179, 40 R, 310/10

(56) References Cited

U.S. PATENT DOCUMENTS

| | | | |
|---|---|---|---|
| 1,443,091 A | | 1/1923 | Petersen .................... 204/156 |
| 2,710,371 A | | 6/1955 | Baensch .................... 318/139 |
| 3,477,878 A | | 11/1969 | Hughes et al. ................. 136/86 |
| 3,493,436 A | * | 2/1970 | Johnsen ........................ 429/10 |
| 3,847,670 A | * | 11/1974 | Johnsen ........................ 429/13 |
| 3,853,628 A | * | 12/1974 | Fox ............................... 429/10 |
| 3,972,731 A | * | 8/1976 | Bloomfield et al. ....... 136/86 R |
| 4,435,663 A | * | 3/1984 | Gambino et al. ........... 310/306 |
| 4,596,750 A | * | 6/1986 | Ruka et al. .................... 429/16 |
| 4,597,170 A | * | 7/1986 | Isenberg .................... 29/623.5 |
| 4,692,274 A | * | 9/1987 | Isenberg et al. ......... 252/519.15 |
| 5,106,706 A | * | 4/1992 | Singh et al. .................... 429/31 |
| 5,108,850 A | * | 4/1992 | Carlson et al. ................ 429/31 |
| 5,175,061 A | * | 12/1992 | Hildebrandt et al. .......... 429/16 |
| 5,516,597 A | * | 5/1996 | Singh et al. .................... 429/30 |
| 5,923,106 A | | 7/1999 | Isaak et al. ................ 310/67 R |
| 6,005,322 A | | 12/1999 | Isaak et al. .................. 310/178 |
| 6,106,963 A | * | 8/2000 | Nitta et al. .................... 429/10 |
| 6,358,641 B1 | * | 3/2002 | Mease .......................... 429/34 |
| 6,360,835 B1 | * | 3/2002 | Skala ....................... 123/41.29 |
| 6,379,828 B1 | * | 4/2002 | Worth .......................... 429/13 |
| 6,379,829 B1 | * | 4/2002 | Kurita .......................... 429/17 |
| 6,458,477 B1 | * | 10/2002 | Hsu ............................. 429/17 |
| 6,508,925 B2 | * | 1/2003 | Long .......................... 205/117 |
| 2002/0074888 A1 | * | 6/2002 | Leger et al. ................ 310/178 |

* cited by examiner

Primary Examiner—Burton S. Mullins
Assistant Examiner—Pedro J. Cuevas
(74) Attorney, Agent, or Firm—Oyen Wiggs Green & Mutala

(57) ABSTRACT

A fuel cell powered magnetically driven shaft assembly comprises: (a) a stationary fuel cell stack having a hollow core; (b) an electrically conductive sleeve lining the hollow core so as to define a cylindrical passage therethrough; and (c) a shaft extending through the sleeve passage and rotatable about the longitudinal axis of the shaft. The shaft is embedded with one or more magnets configured to produce a magnetic field extending substantially perpendicularly to tat longitudinal axis. Anodes of the fuel cell stack are connected to one end of the sleeve and cathodes are connected to the other end so as to provide a path for conducting electrons through the sleeve constrained in a direction parallel to the longitudinal axis. Because the current flows perpendicularly through the magnetic field, an electromagnetic force is produced in a direction which is tangential to the shaft, causing the shaft to rotate about its longitudinal axis.

4 Claims, 5 Drawing Sheets

FUEL CELL POWERED MAGNETICALLY DRIVEN SHAFT ASSEMBLY

TECHNICAL FIELD

This invention relates to a magnetically driven shaft powered by a fuel cell.

BACKGROUND

The fundamental electrochemical processes involved in fuel cells are well understood. A fuel cell is an electrochemical device wherein an input fuel is catalytically reacted with an input oxidant at electrode interfaces that share a common electrolyte in the fuel cell, resulting in a flow of electrons as well as reaction product. Typically, the electrolyte is sandwiched between two thin electrodes, namely a porous anode and a porous cathode. Where the input fuel is hydrogen and the oxidant is oxygen, the fuel cell produces electricity and water. The basic process is highly efficient and, for those fuel cells fueled directly by hydrogen, pollution-free. Further, fuel cells can be assembled into stacks, of varying sizes, and so power systems have been developed to produce a wide range of output levels and thus satisfy numerous kinds of end-use applications, including electric motors.

In the description below, a "fuel cell stack" comprises one or more fuel cell units. Typically, a fuel cell stack comprises multiple fuel cell units stacked together and electrically connected in series.

U.S. Pat. No. 5,923,106 and U.S. Pat. No. 6,005,322 both issued to Isaak et al. disclose the use of a fuel cell to power an electric motor. The '106 patent teaches a fuel cell (of no specific type or description) integrated inside the cylindrical main body of a electric motor, the cylindrical main body having a copper band inlaid on its outer surface. A second, larger cylinder or outer drum placed externally to the main body and concentric with it has a corresponding band of permanent magnets inlaid within its inner circumference. The top of the outer drum is attached to an output shaft. In operation, the fuel cell causes a direct electrical current to flow from positive leads attached in a circular array to one linear end of the copper band to negative leads attached in a circular array to the other linear end of the copper band. A magnetic field exists in the gap between the main body and the outer drum, and the action of the current at right angles to the magnetic field produces a force perpendicular to both axes causing the outer drum to rotate and therefore indirectly cause the output shaft also to rotate.

The '322 patent discloses a variation of the fuel cell powered electric motor in the '106 patent. In the electric motor of the '322 patent, the outer drum is kept stationary and the fuel cell is permitted to rotate within it, rather than the other way around. In the '322 patent, the output shaft is attached to the rotating fuel cell rather than to the outer drum, but otherwise the electric motors in the '106 patent and the '322 patent are essentially identical.

SUMMARY OF INVENTION

A fuel cell powered magnetically driven shaft assembly according to the invention is simpler in construction than similar prior art assemblies. It comprises: (a) a stationary fuel cell stack having a hollow core; (b) an electrically conductive sleeve lining the hollow core so as to define a cylindrical passage therethrough; and (c) a shaft extending through the sleeve passage and rotatable about the longitudinal axis of the shaft. The shaft is embedded with one or more magnets configured to produce a magnetic field extending substantially perpendicularly to the longitudinal axis of the shaft. Anodes of the fuel cell stack are connected to one end of the sleeve and cathodes are connected to the other end so as to provide a path for conducting electrons through the sleeve constrained in a direction parallel to the longitudinal axis of the shaft. Because the current flows perpendicularly through the magnetic field produced by the magnets, an electromagnetic force is produced in a direction which is tangential to the shaft, causing the shaft to rotate about its longitudinal axis.

The assembly may further comprise bearings for supporting the shaft while allowing it to rotate about its longitudinal axis.

The fuel cell stack can be composed of any type of fuel cell, although a "proton exchange membrane" fuel cell is preferred given its relatively high power density and low operating temperature. The fuel cell stack is typically cylindrical, but the outside shape could vary to accommodate various containment spaces.

Such a fuel cell assembly is compact and readily adaptable for many uses, while being simple in construction and relatively inexpensive to manufacture. It has fewer moving parts than prior art assemblies and is less likely to require repair.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
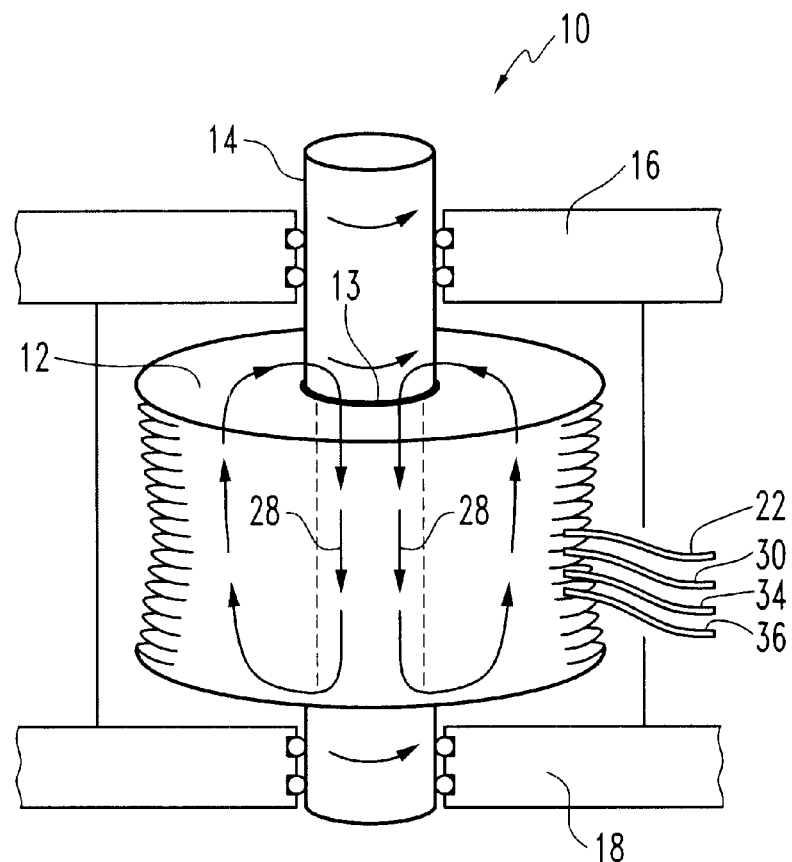
FIG. 1 is a perspective view of a fuel cell powered magnetically driven shaft in accordance with an embodiment of the invention wherein said shaft is rotatably supported by bearings within a cylindrical sleeve lining the hollow, central core of a fuel cell stack.
Figure 2:
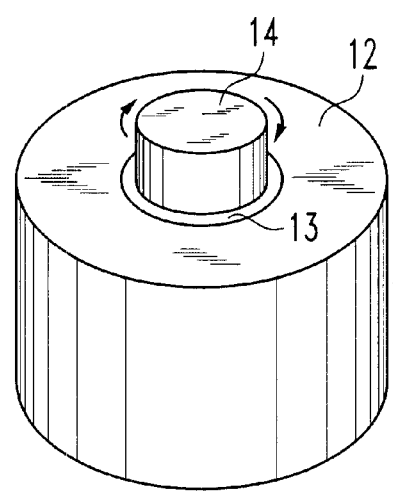
FIG. 2 is a partially cut away view of the shaft and fuel cell stack of FIG. 1.
Figure 3:
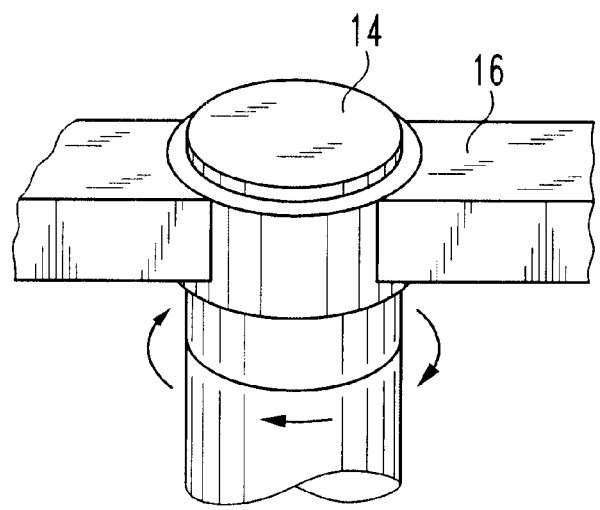
FIG. 3. is a perspective view of bearings supporting the shaft according to an embodiment of the invention.

Referring to FIG. 1 and FIG. 2, a drive shaft assembly 10 comprises a stationary, cylindrical fuel cell stack 12 having a hollow, central core lined with an electrically conductive sleeve 13, which in turn defines a cylindrical passage through which shaft 14 extends. Shaft 14 is rotatable about its longitudinal axis within sleeve 13. As shown in FIG. 1 and FIG. 3, the ends of shaft 14 which protrude from the opposed ends of fuel cell stack 12 are rotatably supported by bearings 16, 18. The particular bearings 16, 18 illustrated in FIG. 1 and FIG. 3 are for illustration purposes only; any bearings capable of supporting shaft 14 while allowing it to rotate about its longitudinal axis can be used. If shaft 14 does not extend all the way through fuel cell stack 12, and protrudes from only one end, then only one set of bearings will be required.

Figure 4:
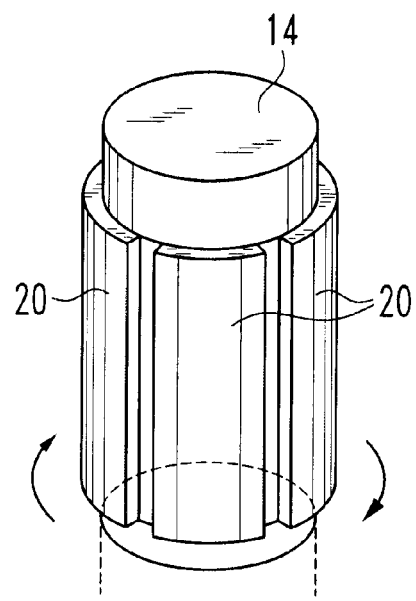
FIG. 4 is a partially cut away perspective view of a shaft embedded with magnets according to an embodiment of the invention.
Figure 5:
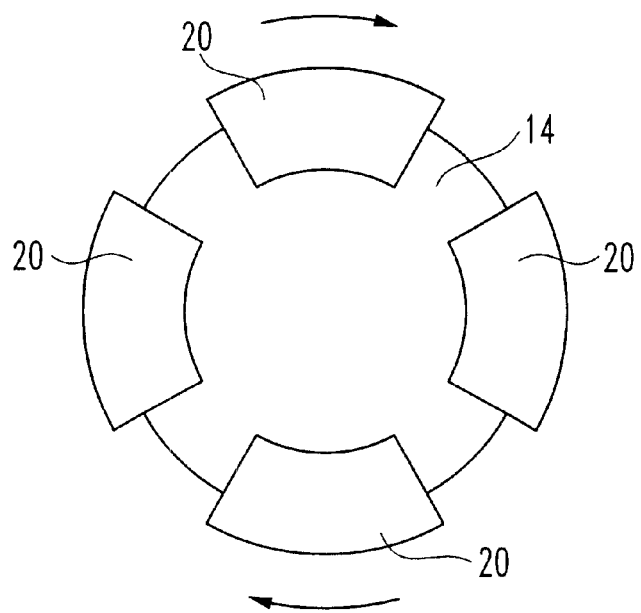
FIG. 5 is a cross-sectional view of the shaft of FIG. 4.
Figure 6:
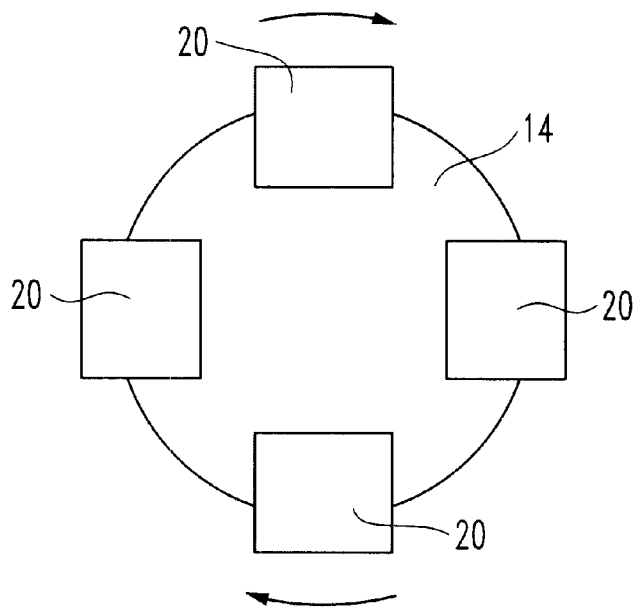
FIG. 6 is a cross-sectional view of an alternative embodiment of the magnet-embedded shaft of FIG. 4.

As shown in FIG. 4, FIG. 5, and FIG. 6, a plurality of magnets 20 are embedded within that portion of shaft 14 which is normally contained within sleeve 13. Magnets 20 are configured to produce a magnetic field which extends substantially perpendicularly to the longitudinal axis of shaft 14. Otherwise, magnets 20 can be of any shape and arrangement and are not limited to those shapes and arrangements illustrated in FIG. 5 and FIG. 6. Even a single magnet having this effect will work, but it is easier to achieve the precise desired effect using a plurality of magnets.

Similarly, fuel cell stack 12 can comprise any type of fuel cell unit. For purposes of illustration, however, the following description of fuel cell stack 12 assumes that fuel cell stack 12 comprises a plurality of "proton exchange membrane" (or "PEM") fuel cell units 38 employing hydrogen as an input fuel. Such PEM fuel cell units 38 offer the advantages of a higher power density and a lower operating temperature (about 70 degrees centigrade) than other fuel cells.

Figure 7:
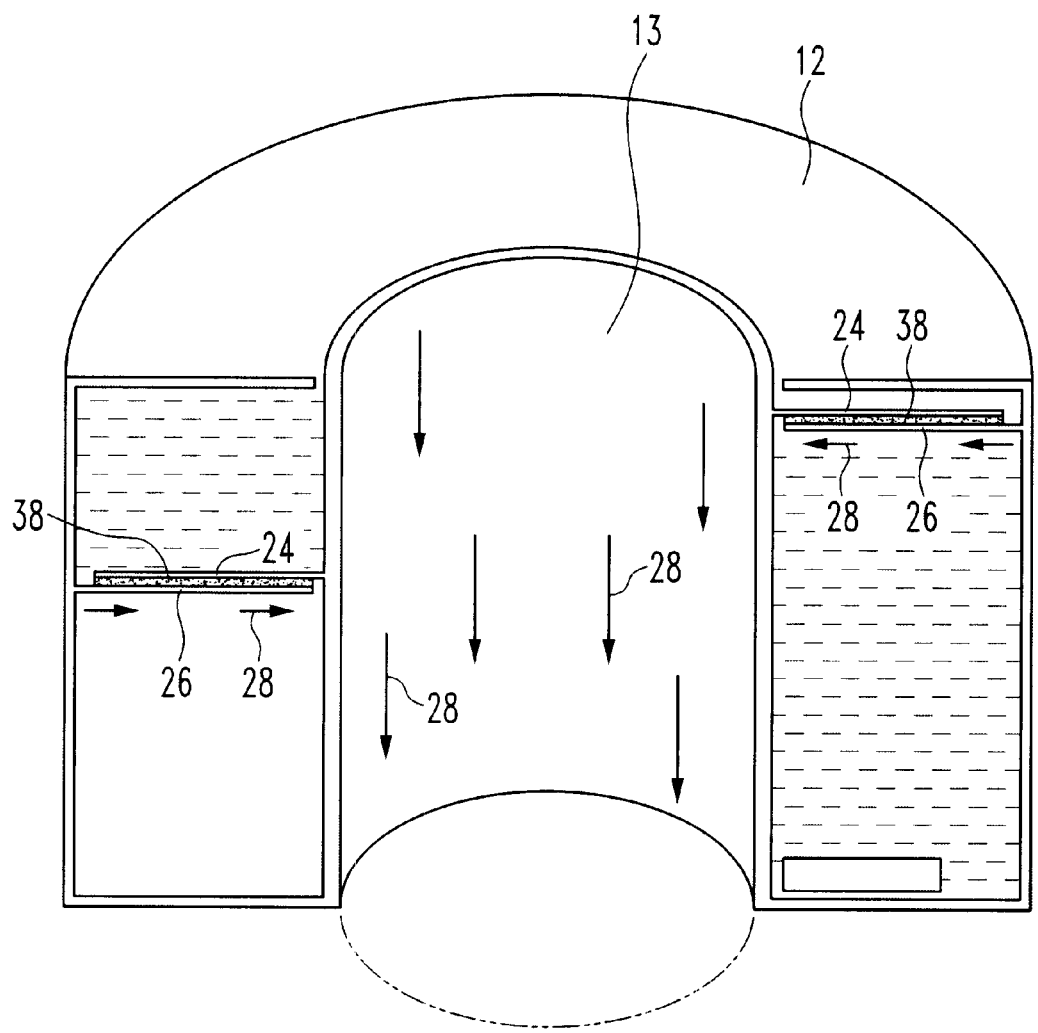
FIG. 7 is an elevation section perspective view through a fuel cell stack comprising multiple fuel cell units according to an embodiment of the invention.
Figure 8:
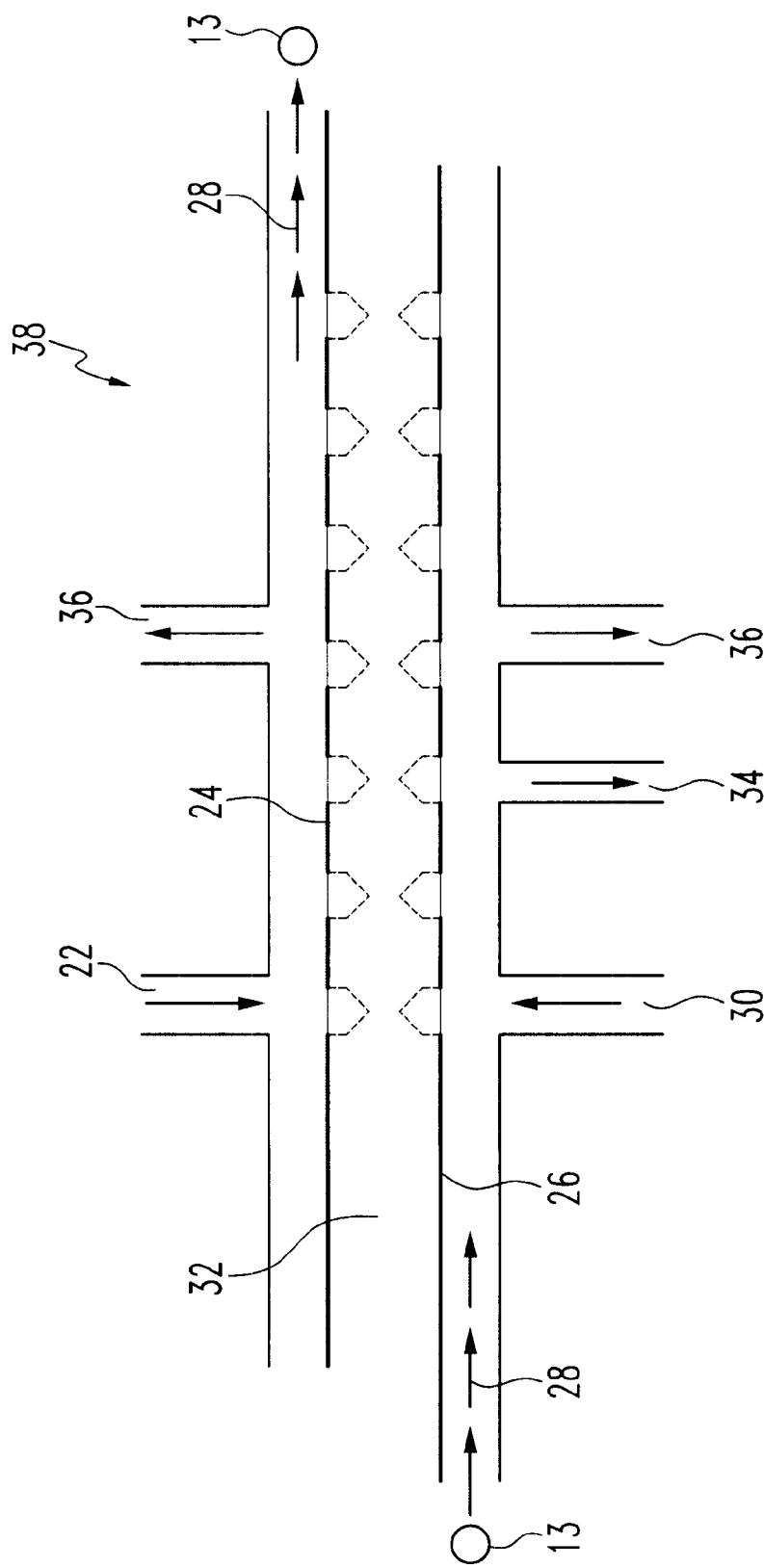
FIG. 8 is a schematic elevation sectional view of a fuel cell unit according to an embodiment of the invention.

As mentioned above, a fuel cell produces a flow of electrons by reacting an input fuel and an input oxidant at respective electrode interfaces which share a common electrolyte. Referring to the embodiment of the invention illustrated in FIG. 1, FIG. 7, and FIG. 8, each of fuel cell units 38 in fuel cell stack 12 comprises an anode 24 and a cathode 26 separated by a solid polymer electrolyte or proton exchange membrane 32. Anode 24 and cathode 26 each comprise a planar electrode diffusion layer or substrate formed of porous, electrically conductive sheet material. Membrane 32 contains a layer of catalyst material at each membrane/electrode interface to induce the desired electrochemical reaction. Anode 24 and cathode 26 are electrically coupled to provide a path for conducting electrons through sleeve 13 constrained into a direction parallel to the longitudinal axis of shaft 14.

Each fuel cell unit 38 receives the input hydrogen fuel via an input fuel line 22 at an anode 24 where the input fuel reacts electrochemically in the presence of the catalyst to produce electrons and protons (hydrogen cations). The anode 24 of each fuel cell unit 38 is connected to one end of sleeve 13; the cathode 26 of each fuel cell unit 38 is connected to the opposite end of sleeve 13. Electrons flow in a direction illustrated in FIG. 1, FIG. 7, and FIG. 8 by arrows 28, namely from the anode 24 of each fuel cell unit 38 in a single direction through sleeve 13 to the corresponding cathode 26 of the same fuel cell unit. The protons simultaneously pass through membrane 32 from anode 24 to cathode 26. Simultaneously, an oxidant such as oxygen or air is introduced via an input oxidant line 30 to cathode 26 where the oxidant reacts electrochemically in the presence of a catalyst and is combined with the electrons arriving from sleeve 13 and the protons passing through membrane 32 so as to form water and complete the electrical circuit. Reaction products-in this case, water and/or water vapor—exit the fuel cell through an output line 34. Any waste heat exits the fuel cell unit 38 through an output line 36.

As mentioned, the current from each anode 24 flows to a corresponding cathode 26 through sleeve 13 in a single direction parallel to the longitudinal axis of shaft 14. Because the current flows perpendicularly through the magnetic field produced by magnets 20 embedded in shaft 14, an electromagnetic force is produced in a direction which is both perpendicular to the magnetic field and perpendicular to the direction of current flow—that is, in a direction tangential to shaft 14. The cumulative effect of all the tangentially directed electromagnetic forces rotates shaft 14 about its longitudinal axis.

The result is a fuel cell powered magnetically driven shaft assembly which is simple in construction and relatively inexpensive to manufacture. At the same time, it is compact and readily adaptable for many uses. Magnets can also readily be embedded within the surface of the rotating shaft in a very compact and very secure manner. This resolves a problem with fuel cell powered electric motors having magnets affixed to the inside circumference of a rotating outer drum, since rapid spinning of an outer drum over a large circumference may cause the magnets to fly off; it is much easier to securely embed such magnets within an inner shaft. The compact nature and fewer moving parts also makes a fuel cell powered magnetically driven shaft assembly according to the invention less likely to break down.

As will be apparent to those skilled in the art in the light of the foregoing disclosure, many alterations and modifications are possible in the practice of this invention without departing from the spirit or scope thereof. As mentioned above by way of example, different types of fuel cell units can be substituted, the precise particular arrangement of magnets on shaft 14 can be rearranged (provided that those magnets produce a magnetic field perpendicular to the longitudinal axis of shaft 14), and other changes can be made without departing from the spirit or scope of the invention. Even sleeve 13 need not have the precise structure hereinbefore described and illustrated in the drawings; the "sleeve" required by the invention can comprise any structure achieving a similar directed flow of electrons as that of sleeve 13 through the magnetic field produced by magnets 20. Accordingly, the scope of the invention is to be construed in accordance with the substance defined by the following claims.

What is claimed is:

1. A fuel cell powered magnetically driven shaft assembly comprising:
    a stationary fuel cell stack having a hollow core;
    an electrically conductive sleeve lining the hollow core of said fuel cell stack so as to define a cylindrical passage therethrough, said sleeve having a first end and a second end; and
    a shaft extending through said sleeve passage and rotatable about a longitudinal axis of said shaft, said shaft having embedded therein at least one magnet configured to produce a magnetic field extending substantially perpendicularly to said longitudinal axis,
    wherein anodes of said fuel cell stack are connected to said sleeve first end and cathodes of said fuel cell stack are connected to said sleeve second end so as to provide a path for conducting electrons through said sleeve constrained in a direction parallel to said longitudinal axis.

2. An assembly as claimed in claim 1 further comprising bearings for rotatably supporting said shaft.

3. An assembly as claimed in claim 1 wherein said fuel cell stack comprises one or more proton exchange membrane fuel cell units.

4. An assembly as claimed in claim 1 wherein said fuel cell stack is cylindrical.

\* \* \* \* \*